US010943024B2

United States Patent
Arasan et al.

(10) Patent No.: US 10,943,024 B2
(45) Date of Patent: *Mar. 9, 2021

(54) QUERYING IN BIG DATA STORAGE FORMATS

(71) Applicant: AMERICAN EXPRESS TRAVEL RELATED SERVICES COMPANY, INC., New York, NY (US)

(72) Inventors: Ravi Arasan, Basking Ridge, NJ (US); Carmen Patricia Argüello, New York, NY (US); Sandeep Bose, Scottsdale, AZ (US); Matthew Kent Meyer, Brooklyn, NY (US); Marimuthu Ponnambalam, Phoenix, AZ (US); Gurusamy Ramasamy, Princeton, NJ (US); Jeremy D. Seideman, Brooklyn, NY (US); Mohammad Torkzahrani, Jersey City, NJ (US); Roopesh R. Varier, Santa Clara, CA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/185,706

(22) Filed: Nov. 9, 2018

(65) Prior Publication Data

US 2019/0095638 A1 Mar. 28, 2019

Related U.S. Application Data

(63) Continuation of application No. 14/944,979, filed on Nov. 18, 2015, now Pat. No. 10,169,601.

(51) Int. Cl.
*G06F 16/00* (2019.01)
*G06F 21/62* (2013.01)
(Continued)

(52) U.S. Cl.
CPC .... *G06F 21/6218* (2013.01); *G06F 16/24534* (2019.01); *G06F 16/258* (2019.01); *G06F 21/6227* (2013.01)

(58) Field of Classification Search
CPC ............ G06F 21/6218; G06F 21/6227; G06F 16/24534; G06F 16/258
See application file for complete search history.

(56) References Cited

U.S. PATENT DOCUMENTS 6,820,168 B2 11/2004 Tanaka
8,090,402 B1 1/2012 Fujisaki
(Continued)

OTHER PUBLICATIONS

U.S. Appl. No. 14/944,902, filed Nov. 18, 2015 and entitled Integrated Big Data Interface for Multiple Storage Types.
(Continued)

*Primary Examiner* — Cheryl Lewis
(74) *Attorney, Agent, or Firm* — Thomas Horstemeyer, LLP

(57) ABSTRACT

A system may receive a request for access to a first variable. The request may include a requested action and a variable identifier for the first variable. The request may also have a syntax that is incompatible with first data storage format. The system may parse the request to capture the variable identifier from the request. The system may also look up a location of the first variable in a catalog using the variable identifier. The location of the first variable may include the first data storage format. The system may generate a query to access the first variable. The syntax of the query may be compatible with the first data storage format. The system may then submit the query to access the first data storage format. The query may be configured to complete the requested action.

20 Claims, 5 Drawing Sheets

(51) Int. Cl.
   *G06F 16/2453* (2019.01)
   *G06F 16/25* (2019.01)

(56) References Cited

U.S. PATENT DOCUMENTS

| | | |
|---|---|---|
| 8,572,679 B1 | 10/2013 | Wang |
| 9,092,502 B1 | 7/2015 | Cannaliato |
| 9,176,966 B2 | 11/2015 | Silverstein |
| 9,542,688 B2 | 1/2017 | Bernard |
| 9,584,517 B1 | 2/2017 | Branchek |
| 9,785,953 B2 | 10/2017 | Desal |
| 2002/0023215 A1 | 2/2002 | Wang |
| 2003/0028529 A1 | 2/2003 | Cheung |
| 2004/0028227 A1 | 2/2004 | Yu |
| 2005/0027723 A1 | 2/2005 | Jones |
| 2005/0049924 A1 | 3/2005 | DeBettencourt |
| 2005/0144451 A1 | 6/2005 | Voice |
| 2005/0149761 A1 | 7/2005 | Chiviendacz |
| 2006/0195449 A1 | 8/2006 | Hunter |
| 2006/0282864 A1 | 12/2006 | Gupte |
| 2006/0294354 A1 | 12/2006 | McCall |
| 2007/0005648 A1 | 1/2007 | Armanino |
| 2007/0005967 A1 | 1/2007 | Mister |
| 2007/0045403 A1 | 3/2007 | Slonecker, Jr. |
| 2007/0064598 A1 | 3/2007 | Nooner |
| 2007/0157016 A1 | 7/2007 | Dayan |
| 2008/0086759 A1 | 4/2008 | Colson |
| 2008/0229352 A1 | 9/2008 | Pino |
| 2008/0275951 A1 | 10/2008 | Branson |
| 2009/0013194 A1 | 1/2009 | Mir |
| 2009/0113110 A1 | 4/2009 | Chen |
| 2009/0136121 A1 | 5/2009 | Nakagaki |
| 2009/0204613 A1 | 8/2009 | Muroi |
| 2009/0254463 A1 | 10/2009 | Tomchek |
| 2010/0082384 A1 | 4/2010 | Bohrer |
| 2010/0088338 A1 | 4/2010 | Pavoni |
| 2010/0198769 A1 | 8/2010 | Gould |
| 2011/0047072 A1 | 2/2011 | Clurea |
| 2011/0264497 A1 | 10/2011 | Clyne |
| 2011/0264567 A1 | 10/2011 | Clyne |
| 2011/0313835 A1 | 12/2011 | Falkenborg |
| 2011/0313900 A1 | 12/2011 | Falkenborg |
| 2012/0022945 A1 | 1/2012 | Falkenborg |
| 2012/0066107 A1 | 3/2012 | Grajetzki |
| 2012/0079537 A1 | 3/2012 | Kalidindi et al. |
| 2012/0089562 A1 | 4/2012 | Deremigio |
| 2012/0185925 A1 | 7/2012 | Barkie |
| 2012/0215684 A1 | 8/2012 | Kidron |
| 2013/0066771 A1 | 3/2013 | Clurea |
| 2013/0124413 A1 | 5/2013 | Itwaru |
| 2013/0151388 A1 | 6/2013 | Falkenborg |
| 2013/0187926 A1 | 7/2013 | Silverstein |
| 2013/0218769 A1 | 8/2013 | Pourfallah |
| 2014/0046842 A1 | 2/2014 | Irudayam |
| 2014/0165133 A1 | 6/2014 | Foley |
| 2014/0365363 A1 | 12/2014 | Knudsen |
| 2015/0026462 A1 | 1/2015 | Ramesh et al. |
| 2015/0127516 A1 | 5/2015 | Studnitzer |
| 2015/0150023 A1 | 5/2015 | Johnson |
| 2015/0161301 A1 | 6/2015 | Begur |
| 2015/0178532 A1 | 6/2015 | Brule |
| 2015/0193243 A1 | 7/2015 | Varkhedi |
| 2015/0193638 A1 | 7/2015 | Cook |
| 2015/0227931 A1 | 8/2015 | Genovez |
| 2015/0261881 A1 | 9/2015 | Wensel |
| 2015/0261948 A1 | 9/2015 | Marra |
| 2015/0324900 A1 | 11/2015 | Starikova |
| 2015/0370232 A1 | 12/2015 | Kohn |
| 2016/0014148 A1 | 1/2016 | Lee |
| 2016/0020297 A1 | 1/2016 | Kuang |
| 2016/0070971 A1 | 3/2016 | Nakashima |
| 2016/0080493 A1 | 3/2016 | Roth |
| 2016/0088566 A1 | 3/2016 | Stephens |
| 2016/0092557 A1 | 3/2016 | Stojanovic |
| 2016/0189119 A1 | 6/2016 | Bowman |
| 2016/0203478 A1 | 7/2016 | Gardiner |
| 2016/0314403 A1 | 10/2016 | Chakraborty |
| 2017/0017708 A1 | 1/2017 | Fuchs |
| 2017/0085445 A1 | 3/2017 | Layman |
| 2017/0091847 A1 | 3/2017 | Cama |
| 2017/0154067 A1* | 6/2017 | Hazlewood ......... G06F 16/9535 |
| 2017/0169068 A1 | 6/2017 | Kennedy, Jr. |
| 2017/0295062 A1 | 10/2017 | Tang |
| 2017/0364584 A1* | 12/2017 | Ginter ................. G06F 16/148 |

OTHER PUBLICATIONS

U.S. Appl. No. 14/944,979, filed Nov. 18, 2015 and entitled System and Method for Reading and Writing to Big Data Storage Formats.
U.S. Appl. No. 14/945,032, filed Nov. 18, 2015 and entitled System and Method for Creating, Tracking, and Maintaining Big Data Use Cases.
U.S. Appl. No. 14/944,849, filed Nov. 18, 2015 and entitled System and Method for Automatically Capturing and Recording Lineage Data for Big Data Records.
U.S. Appl. No. 14/944,898, filed Nov. 18, 2015 and entitled Systems and Methods for Tracking Sensitive Data in a Big Data Environment.
U.S. Appl. No. 14/944,961, filed Nov. 18, 2015 and entitled System and Method Transforming Source Data Into Output Data in Big Data Environments.
USPTO; Non-Final Office Action dated Sep. 21, 2017 in U.S. Appl. No. 14/945,032.
USPTO; Non-Final Office Action dated Dec. 1, 2017 in U.S. Appl. No. 14/944,961.
USPTO; Non-Final Office Action dated Dec. 28, 2017 in U.S. Appl. No. 14/944,849.
Non-Final Office Action dated Feb. 14, 2018 in U.S. Appl. No. 14/944,902.
Non-Final Office Action dated Feb. 23, 2018 in U.S. Appl. No. 14/944,898.
Notice of Allowance dated Mar. 26, 2018 in U.S. Appl. No. 14/944,849.
USPTO, Non-Final Office Action dated Apr. 5, 2018 in U.S. Appl. No. 14/944,979.
Final office Action dated Apr. 18, 2018 in U.S. Appl. No. 14/945,032.
Notice of Allowance dated May 22, 2018 in U.S. Appl. No. 14/944,902.
Final office Action dated May 30, 2018 in U.S. Appl. No. 14/944,898.
Notice of Allowance dated Jun. 12, 2018 in U.S. Appl. No. 14/944,961.
Advisory Action dated Jun. 27, 2018 in U.S. Appl. No. 14/945,032.
U.S. Appl. No. 16/036,326 dated Jul. 16, 2018 and titled Lineage Data for Big Data Records.
Non-Final Office Action dated Aug. 3, 2018 in U.S. Appl. No. 14/944,898.
Non-Final Office Action dated Aug. 7, 2018 in U.S. Appl. No. 14/945,032.
Notice of Allowance dated Oct. 5, 2018 in U.S. Appl. No. 14/944,979.
Non-Final Office Action dated Feb. 7, 2018 in U.S. Appl. No. 14/972,314.
Non-final Offive Action dated Jun. 7, 2018 U.S. Appl. No. 14/994,311.
Non-Final Office Action dated Jun. 12, 2018 in U.S. Appl. No. 15/897,747.
Notice of Allowance dated Jun. 29, 2018 in U.S. Appl. No. 14/971,314.
Non-Final Office Action dated Nov. 28, 2016 in U.S. Appl. No. 15/383,645.
Final Office Action dated Feb. 21, 2019 in U.S. Appl. No. 14/944,898.

* cited by examiner

QUERYING IN BIG DATA STORAGE FORMATS

CROSS REFERENCE TO RELATED APPLICATIONS

This application is a continuation of, claims priority to and the benefit of, U.S. Ser. No. 14/944,979 filed Nov. 18, 2015 and entitled "SYSTEM AND METHOD FOR READING AND WRITING TO BIG DATA STORAGE FORMATS," which is hereby incorporated by reference in its entirety.

FIELD

The present disclosure relates to systems for reading and writing data to varying big data storage formats.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances. However, traditional relational databases may not be capable of sufficiently handling the size of the tables that big data creates.

As a result, the massive amounts of data in big data sets may be stored in numerous different data storage formats in various locations to service diverse application parameters and use case parameters. Each different data storage format typically has a different interface approach as well. For users, the difficulty of learning the various interface protocols, each having varying query syntaxes and adapting programs to interact with multiple storage formats, creates difficulties for users of big data formats. In big data, different applications may operate best on different storage formats. For example, an application needing a near-instantaneous response time for a user experience may demand a platform designed to return fast query results. In some instances, a preferred query syntax or language for use in a particular application may be incompatible with well-suited storage formats for the application.

SUMMARY

A system, method, and computer readable medium (collectively, the "system") is disclosed for providing controlled read and write access to various big data storage formats. The system may receive a request for access to a first variable. The request may include a requested action and a variable identifier for the first variable. The request may also have a syntax that is incompatible with first data storage format. The system may parse the request to capture the variable identifier from the request. The system may also look up a location of the first variable in a catalog using the variable identifier. The location of the first variable may include the first data storage format. The system may generate a query to access the first variable. The syntax of the query may be compatible with the first data storage format. The system may then submit the query to access the first data storage format. The query may be configured to complete the requested action.

In various embodiments, the system may check an access permission for the first variable and deny the request at least partially in response to the access permission. The access permission may indicate that the request does not have permission to access the first variable. The system may format a result of the requested action into a requested result format with data from the first data storage format. The system may further generate a log entry corresponding to the request and comprising a user identifier and/or an application identifier. The system may receive the request for access to a second variable stored in a second data storage format with the second data storage format different from the first data storage format, and the system may then return a result of the requested action. The result may include the first variable from the first data storage format and the second variable from the second data storage format. The system may also write data to the first variable in the first data storage format in response to the request.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record.

The present disclosure provides a system, method, and computer program product for querying various data storage formats with a preferred language. Differing data storage formats may be compatible with various query languages, syntaxes, and/or interfaces. For example, SQL-type queries written in the hive query language (HQL) may be used to access data stored in Hive® data storage format. However, the same SQL-type queries may not be used to access data stored in an HBase storage system, which relies on a noSQL interface to retrieve stored data. A unified virtualized database layer may provide an interface to interact with the Hive® and HBase data storage formats, as well as any other big data storage formats, using a uniform query language to retrieve, write, read, and otherwise work with stored data. A big data reader/writer may then parse and translate queries written in various languages into the unified virtualized database interface language or directly into the various languages of the various data storage formats. Users may write queries in their preferred query language or interface to access data and/or data storage formats that may typically be incompatible with their preferred query language or format.

Figure 1:
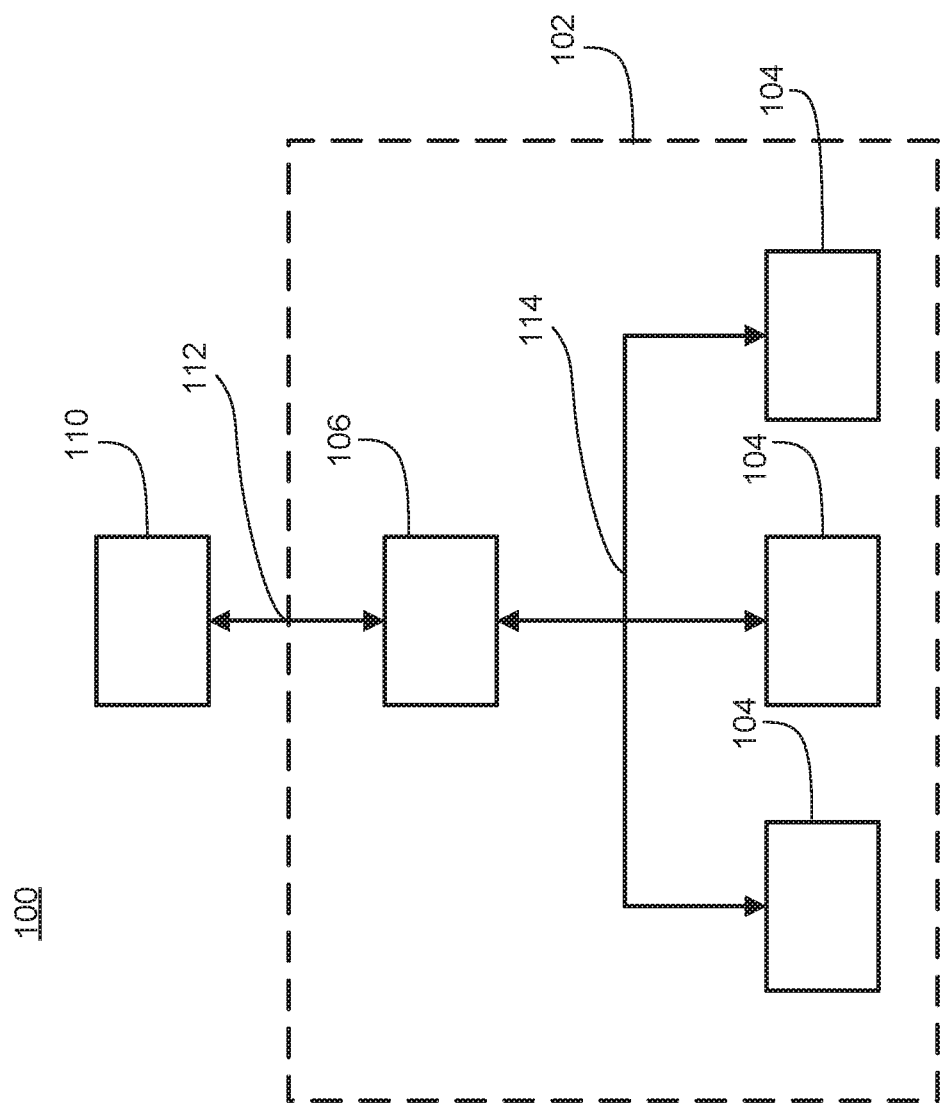
FIG. 1 illustrates an exemplary system for storing, reading, and writing big data sets, in accordance with various embodiments.

With reference to FIG. 1, a distributed file system (DFS) 100 is shown, in accordance with various embodiments. DFS 100 comprises a distributed computing cluster 102 configured for parallel processing and storage. Distributed computing cluster 102 may comprise a plurality of nodes 104 in electronic communication with each of the other nodes, as well as a control node 106. Processing tasks may be split among the nodes of distributed computing cluster 102 to improve throughput and enhance storage capacity. Distributed computing cluster 102 may be, for example, a Hadoop® cluster configured to process and store big data sets with some of nodes 104 comprising a distributed storage system and some of nodes 104 comprising a distributed processing system. In that regard, distributed computing cluster 102 may be configured to support a Hadoop® distributed file system (HDFS) as specified by the Apache Software Foundation at http://hadoop.apache.org/docs/.

In various embodiments, nodes 104, control node 106, and client 110 may comprise any devices capable of receiving and/or processing an electronic message via network 112 and/or network 114. For example, nodes 104 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or, network 114 may comprise an external connection to enable direct electronic communication with client 110 and the internet.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), and symmetric and asymmetric cryptography systems.

In various embodiments, DFS 100 may process hundreds of thousands of records from a single data source. DFS 100 may also ingest data from hundreds of data sources. Nodes 104 may process the data in parallel to expedite the processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104. Each node 104 may then process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 2:
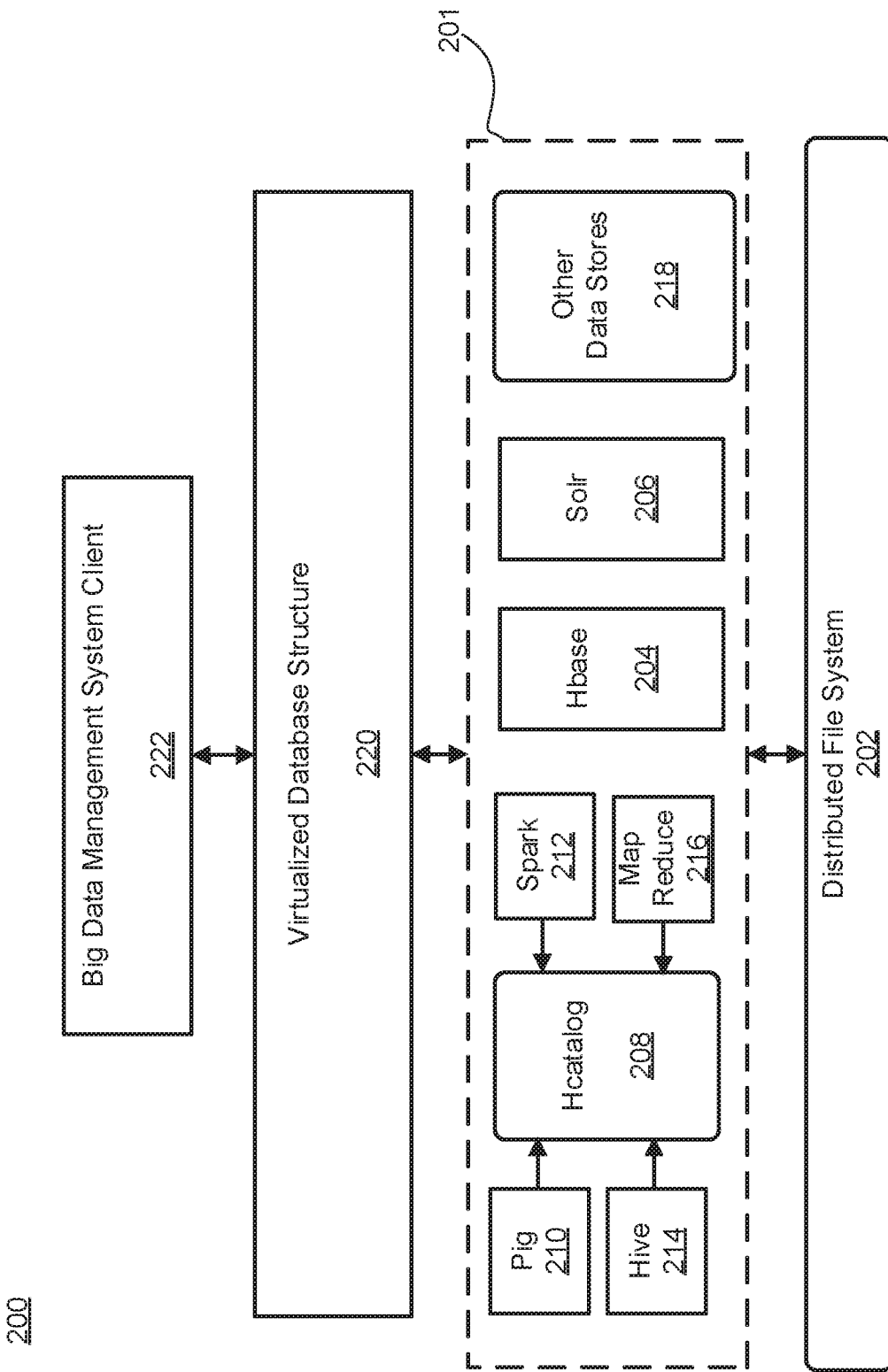
FIG. 2 illustrates an exemplary big data management system supporting a unified, virtualized interface for multiple data storage formats, in accordance with various embodiments.

With reference to FIG. 2, an exemplary architecture of a big data management system (BDMS) 200 is shown, in accordance with various embodiments. BDMS 200 may by similar to or identical to DFS 100 of FIG. 1, for example. DFS 202 may serve as the physical storage medium for the various data storage formats 201 of DFS 202. A non-relational database 204 may be maintained on DFS 202. For example, non-relational database 204 may comprise an HBase™ storage format that provides random, real time read and/or write access to data, as described and made available by the Apache Software Foundation at http://hbase.apache.org/.

In various embodiments, a search platform 206 may be maintained on DFS 202. Search platform 206 may provide distributed indexing and load balancing to support fast and reliable search results. For example, search platform 206 may comprise a Solr® search platform as described and made available by the Apache Software Foundation at http://lucene.apache.org/solr/.

In various embodiments, a data warehouse 214 such as Hive® may be maintained on DFS 202. The data warehouse 214 may support data summarization, query, and analysis of warehoused data. For example, data warehouse 214 may be a Hive® data warehouse built on Hadoop® infrastructure. A data analysis framework 210 may also be built on DFS 202 to provide data analysis tools on the distributed system. Data analysis framework 210 may include an analysis runtime environment and an interface syntax similar to those offered in the Pig platform as described and made available by the Apache Software Foundation at https://pig.apache.org/.

In various embodiments, a cluster computing engine 212 for high-speed, large-scale data processing may also be built on DFS 202. For example, cluster computing engine 212 may comprise an Apache Spark™ computing framework running on DFS 202. DFS 202 may further support a MapReduce layer 216 for processing big data sets in a parallel, distributed manner to produce records for data storage formats 201. For example, MapReduce layer 216 may be a Hadoop® MapReduce framework distributed with the Hadoop® HDFS as specified by the Apache Software Foundation at http://hadoop.apache.org/docs/. The cluster computing engine 212 and MapReduce layer 216 may ingest data for processing, transformation, and storage in data storage formats 201 using the distributed processing and storage capabilities of DFS 202.

In various embodiments, DFS 202 may also support a table and storage management layer 208 such as, for example, an HCatalog installation. Table and storage management layer 208 may provide an interface for reading and writing data for multiple related storage formats. Continuing the above example, an HCatalog installation may provide an interface for one or more of the interrelated technologies described above such as, for example, Hive®, Pig, Spark®, and Hadoop® MapReduce.

In various embodiments, DFS 202 may also include various other data storage formats 218. Other data storage formats 218 may have various interface languages with varying syntax to read and/or write data. In fact, each of the above disclosed storage formats may vary in query syntax and interface techniques. Virtualized database structure 220 may provide a uniform, integrated user experience by offering users a single interface point for the various different data storage formats 201 maintained on DFS 202. Virtualized database structure 220 may be a software and/or hardware layer that makes the underlying data storage formats 201 transparent to client 222 by providing variables on request. Client 222 may request and access data by requesting variables from virtualized database structure 220. Virtualized database structure 220 may then access the variables using the various interfaces of the various data storage formats 201 and return the variables to client 222.

In various embodiments, the data stored using various above disclosed data storage formats 201 may be stored across data storage formats 201 and accessed at a single point through virtualized database structure 220. The variables accessible through virtualized database structure 220 may be similar to a column in a table of a traditional RDBMS. That is, the variables identify data fields available in the various data storage formats 201.

In various embodiments, variables may be stored in a single one of the data storage formats 201 or replicated across numerous data storage formats 201 to support different access characteristics. Virtualized database structure 220 may comprise a catalog of the various variables available in the various data storage formats 201. The cataloged variables enable BDMS 200 to identify and locate variables stored across different data storage formats 201 on DFS 202. Variables may be stored in at least one storage format on DFS 202 and may be replicated to multiple storage formats on DFS 202. The catalog of virtualized database structure 220 may thus track the location of variables available in multiple storage formats.

The variables may be cataloged as they are ingested and stored using data storage formats 201. The catalog may track the location of variables by identifying the storage format, the table, and/or the variable name for each variable available through virtualized database structure 220. The catalog may also include metadata describing what the variables are and where the variables came from such as data type, original source variables, timestamp, access restrictions, sensitivity of the data, and/or other descriptive metadata. For example, internal data and/or personally identifying information (PII) may be flagged as sensitive data subject to access restrictions by metadata corresponding to the variables containing the internal data and/or PII. Metadata may be copied from the storage formats 201 or generated separately for virtualized database structure 220.

In various embodiments, virtualized database structure 220 may provide a single, unified, and virtualized data storage format that catalogues accessible variables and provides a single access point for records stored on data storage formats 201. Client 222 (which may operate using similar hardware and software to client 110 of FIG. 1) may access data stored in various data storage formats 201 via the virtualized database structure 220. In that regard, virtualized database structure 220 may be a single access point for data stored across the various data storage formats 201 on DFS 202.

In various embodiments, virtualized database structure 220 may store and maintain the catalog of variables including locations and descriptive metadata, but virtualized database structure 220 may not store the actual data contained in each variable. The data that fills the variables may be stored on DFS 202 using data storage formats 201. Virtualized database structure 220 may enable read and write access to the data stored in data storage formats 201 without a client system having knowledge of the underlying data storage formats 201.

Figure 3:
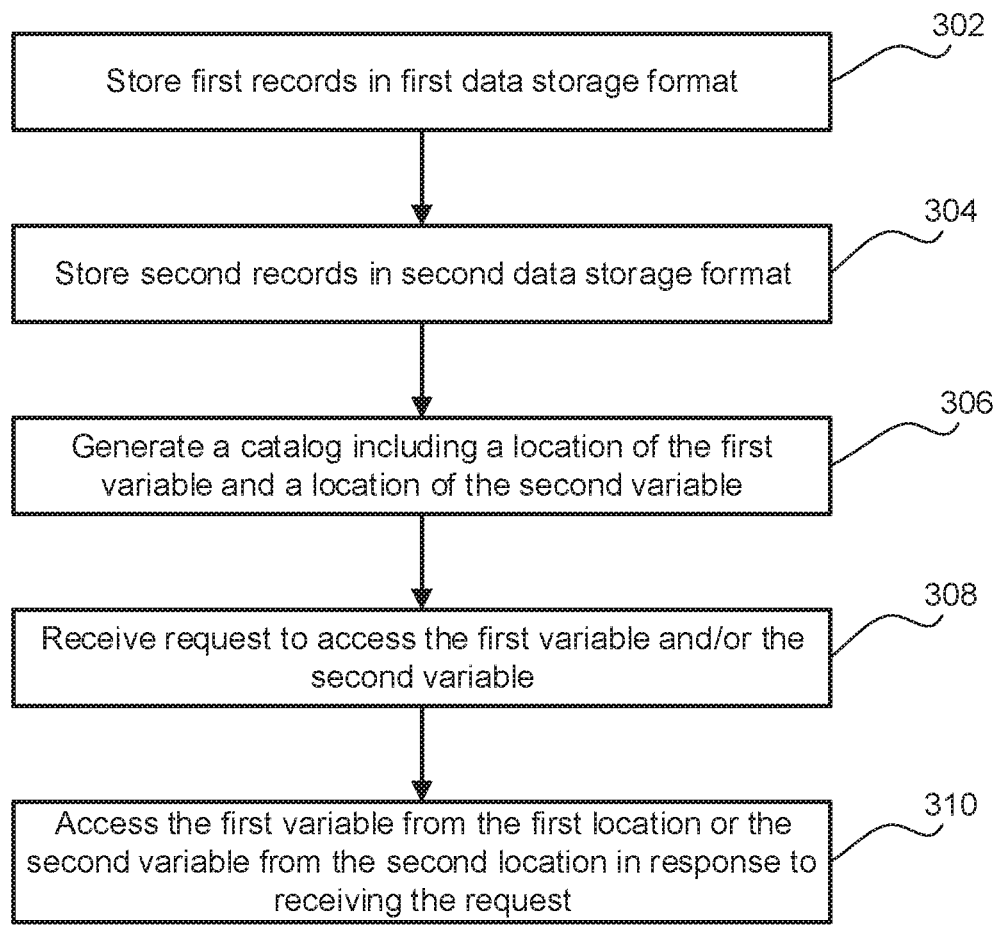
FIG. 3 illustrates an exemplary process for providing a virtualized database structure that appears as a single data storage format to a client but interacts with various multiple data storage formats to read and write data, in accordance with various embodiments.

With reference to FIG. 3, a process 300 for maintaining a virtualized database structure using BDMS 200 is shown, in accordance with various embodiments. BDMS 200 may store a plurality of first records in a first data storage format (Block 302). The first records (e.g., rows in a table) may include one or more variables (e.g., columns in a table) with each variable identifying a data field of the records. The first data storage format may include one of data storage formats 201 described above with reference to FIG. 2.

In various embodiments, BDMS 200 may then store a plurality of second records in a second data storage format (Block 304). The second data storage format may also comprise one of data storage formats 201 described above with reference to FIG. 2. The second data storage format may be different than the first data storage format. Thus, the second data storage format may use a different interface than the first data storage format for reading or writing data.

In various embodiments, BDMS 200 may generate a catalog including a location of the first variable and a location of the second variable (Block 306). The location of the first variable may identify the first data storage format as the location of the first variable. Similarly, the location of the second variable may identify the second data storage format as the location of the second variable. Thus, the first variable and the second variable may be generated and/or stored using different data storage formats 201. In that regard, a different interface may be used to read and/or write data of the first variable than is used to read and/or write data of the second variable. The catalog may also be generated to include metadata describing the details of the variables such as, for example, data type, access permission, original source variable, timestamp, description, age, version number, and/or transformation history.

In various embodiments, BDMS 200 may receive a request to access the first variable and/or the second variable (Block 308). The request may not identify the first data storage format or the second data storage format. Instead, the request may identify the variable for which access is requested. BDMS 200 may locate the variable for which access is requested by consulting the catalog maintained by virtualized database structure 220. In that regard, BDMS 200 may provide a unified point of access for the first data storage format and second data storage format despite the different data structures of the various data storage formats 201.

In various embodiments, BDMS 200 may access the first variable from the first location or the second variable from the second location (Block 310). With brief reference to FIG. 2, the request for a variable may come from a client 222 and may be received by virtualized database structure 220 of BDMS 200. Virtualized database structure 220 may then look up the requested variable in the catalog to identify the location of the variable. The location of the variable may include the data storage format(s) that maintain the variable and an identifier for the variable within the data storage format (e.g., a table and column number corresponding to the variable). The requested variable and corresponding data may be returned to client 222 that made the request. Virtualized database structure 220 may thus appear as a single data storage format to client 222.

Figure 4:
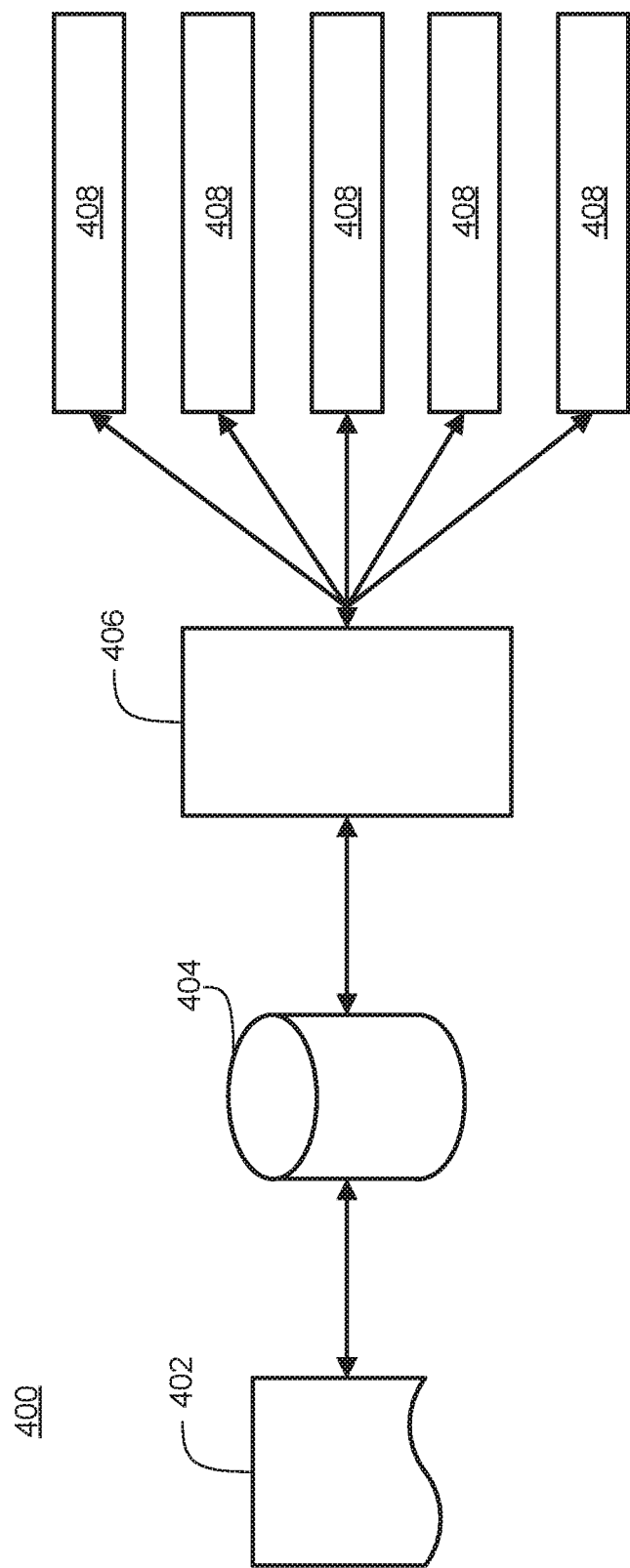
FIG. 4 illustrates an exemplary architecture for a big data access interface system, in accordance with various embodiments.

With reference to FIG. 4, an access interface system 400 is shown for reading and/or writing data stored in big data storage formats, in accordance with various embodiments. Raw data 402 is ingested and/or stored in big data storage 404. Big data storage 404 may be a single organized database environment such as virtualized database structure 220 of FIG. 2. Big data storage 404 may thus comprise multiple data storage formats, having both compatible and incompatible interface protocols and query syntaxes, and organized into a single logical data structure as viewed from the application side. For example, a Hive® data storage format may be a delimited flat file stored to disk across a distributed file system. The Hive® data storage format may also support SQL-type queries for data access. However, the same SQL-type query that would successfully retrieve data in Hive® would throw an error in Hbase, as Hbase is not compatible with the SQL-type queries of Hive®.

In various embodiments, an access interface 406 may communicate with big data storage 404 to read and write data for use cases and applications 408. In that regard, access interface 406 may comprise a software interface that supports the access demands of use cases and applications 408. Access interface 406 may run partially or fully on a file system such as DFS 202 to access data via virtualized database structure 220. Access interface 406 may also run partially or fully on a client computer such as client 222. Access interface system may limit direct read and write access directly to big data storage 404 by use cases and applications 408. Instead, use cases and applications 408 may submit requests for read and write access to data using access interface 406.

In various embodiments, use cases and applications 408 may include applications developed using big data storage formats for data demands such as external facing applications and internal applications. Use cases and applications 408 may also comprise use cases relying on a preferred big data storage format, such as a Hive® data set, an Apache Pig data set, and/or a JSON-like java data set of tuples.

In various embodiments, access interface 406 may accept data access requests from use cases and applications 408 in one or more interface protocols and/or syntax. The interface protocols and the interface syntaxes suitable for data requests from access interface 406 may include known text-based query syntaxes such as, for example, SQL, HQL, Solr search strings, noSQL javascript search functions, and/or PigLatin. Suitable interface protocols may also include graphical query construction tools available for use with big data technologies such as, for example, Hive®, Hbase, Solr®, Elasticsearch®, Lucene™, Apache Spark™, Pig, and/or Hadoop® MapReduce. Additionally, an interface tool and/or query language written specifically for access interface 406 may be used to make read and/or write requests using access interface 406.

In various embodiments, access interface 406 may accept and successfully parse queries and requests that comply with one or more of the above mentioned interface protocols. Access interface 406 may thus be compatible with one or more of the above mentioned interface protocols. In fact, access interface 406 may be compatible with several of the above mentioned interface protocols to provide increased flexibility. In that regard, use cases and applications 408 may access the data using their preferred data storage format or programming language through a single, centralized access point created by access interface 406. However, use cases and applications 408 may not write directly to the underlying data storage formats. With use cases and applications 408 using access interface 406 as the sole point of access to underlying big data storage 404, access interface 406 may exert access control over the tables, files, records, and data storage formats used in big data storage 404. At the same time, access interface 406 may restrict use cases and applications 408 from creating and maintaining independent data stores to service the application demands where such data stores are unnecessarily duplicative.

In various embodiments, use cases and applications 408 may submit requests to access interface 406 using a compatible syntax and/or interface protocol. Although the request is compatible with access interface 406, the request may not be compatible with the data storage format in which the data is actually stored in big data storage 404. Thus, access interface 406 may parse the query and identify information it that it will use to access the selected data in big data storage 404. In that regard, access interface 406 may be big data storage format agnostic and capable of locating requested data and retrieving the data in the requested format. The request may include one or more piece of request data comprising one or more of a variable identifier such as a variable name, a preferred data storage format, a time, and/or a requestor ID such as a username, a user group, or an application ID.

In various embodiments, access interface 406 may use the request data to look up the variable in a catalog such as the above described catalog of virtualized database structure 220. The catalog may comprise access permissions and restrictions for the requesting user and/or application as well as the location and format of the requested variable. Access permissions may include whether a use case or application 408 has read and/or write access to the requested data, and whether the use case or application 408 is authorized to view the information contained in the variable (for example, in the case of personally identifying information). Access permissions may be catalogued at the file, table, variable, and/or data type levels. Access interface may deny access to data that a requestor does not have sufficient permissions to access by looking up the access permissions for the requesting user and applying them prior to returning a result set. Access interface 406 may log the request along with the request data for later review.

In various embodiments, access interface system 400 may provide controlled access to the data in a format that a requesting application or use case requests. Access interface 406 may retrieve specific variables from the data that are responsive to a request by use cases and applications 408. The retrieved data may be formatted into a result that would be returned by the requested data storage format even when the underlying data is stored in a different data storage format than requested. A result set may be compiled and returned to the requesting use case and application 408 as a result set from a requested data storage format type. Once prepared, the result set may be returned to the requestor in the requested format or a suitable format if no format was specified. A suitable return format may include the result format of the data storage format that is compatible with the interface protocol of the original access request.

Figure 5:
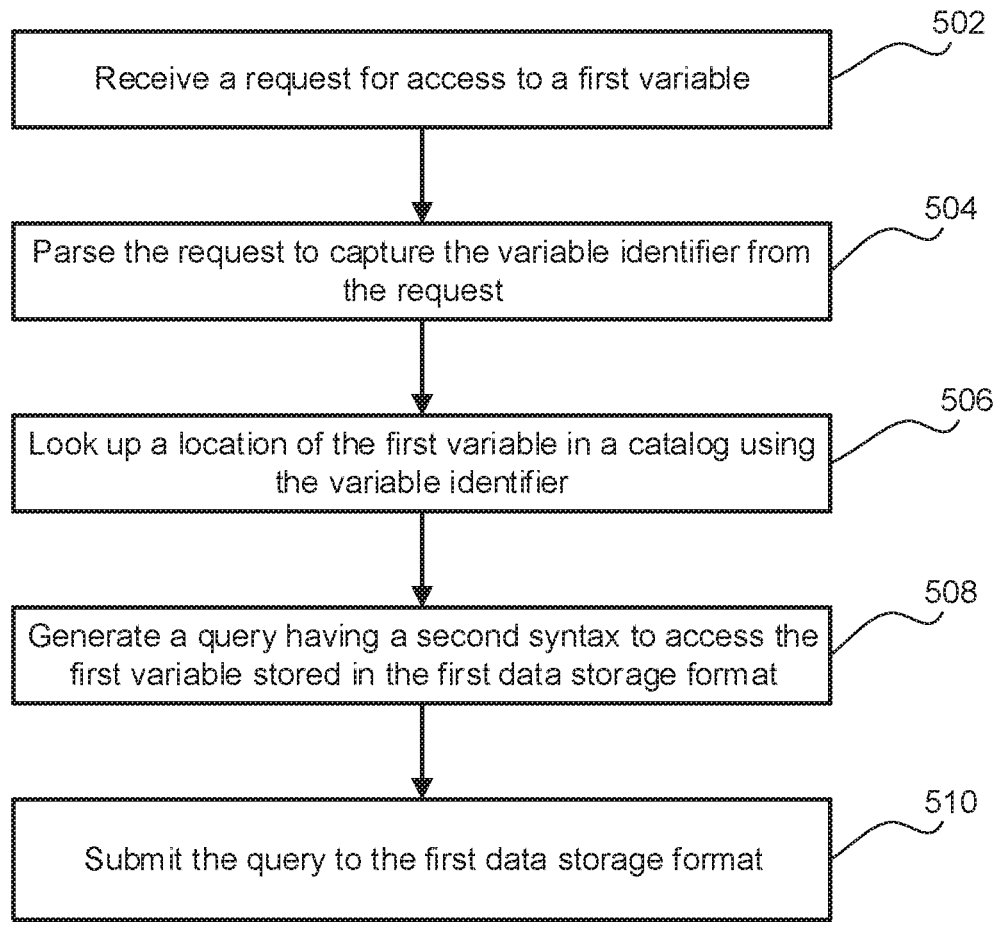
FIG. 5 illustrates an exemplary process for accessing data in response to queries from applications and use cases with the data located in various data storage formats having differing syntax, in accordance with various embodiments.

With reference to FIG. 5, a process 500 for providing access to big data storage with access interface 406 is shown, in accordance with various embodiments. Access interface system 400 may receive a request for access to a variable (Block 502). The request may include an action (e.g., read or write) and a variable identifier (e.g., a variable position, a variable name, a variable ID). The request may include an interface protocol or interface syntax. In various embodiments, the interface protocol and/or syntax may be incompatible with the data storage format in which the variable is stored in big data storage 404.

In various embodiments, the access interface system 400 may parse the request to capture the variable identifier (Block 504). The variable identifier may be used to retrieve the location of the variable (e.g., the data storage format in which the variable is stored) from the catalog. The variable identifier may also be used to look up related metadata stored in the catalog for the variable such as, for example, access permissions and/or whether the variable contains PII.

In various embodiments, access interface system 400 may look up the location of the first variable in the catalog using the variable identifier (Block 506). The location of the variable may include the data storage format. Access interface system 400 may then generate a query to access the first variable (Block 508). The query may have a syntax that is compatible with the data storage format. In that regard, the query may be configured to read and/or write to the data storage format. Access interface system 400 may then submit the query to the data storage format (Block 510).

The systems and methods herein provide support access to a wide variety of data storage formats (e.g., Hive®, Solr®, Hbase) having different support processing approaches (e.g., batch, real-time, process). The access interface enables applications and programmers to access data in a big data environment using the preferred interface application and/or programming language through a unified, centralized access point. The access interface is data storage format agnostic and can locate and retrieve data in a requested format. In addition, the data access system disclosed herein provides centralized data access and management control as well as holistic logging utilities. The BDMS of the present disclosure may thus reduce the number of copies of data made by clients by managing access to requested variables and returning the same variables to multiple clients without making superfluous copies. In that regard, the BDMS may also ensure that clients are using maintained and updated data.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, nonrelational, hierarchical, graphical, or object-oriented structure and/or any other database configurations including various big data products available from the Apache Software Foundation as described above. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a processor, a request having a first syntax at an access point for access to a first variable;
   parsing, by the processor, the request to capture a variable identifier for the first variable from the request;
   looking up, by the processor, the first variable in a catalog using the variable identifier, wherein the first variable includes a location of the first variable and a first data storage format;
   generating, by the processor, a query to access the first variable, wherein the query comprises a second syntax compatible with the first data storage format; and
   submitting, by the processor, the query in the first data storage format to complete the request.

2. The method of claim 1, wherein the request comprises a requested action and the variable identifier for the first variable.

3. The method of claim 1, wherein the first data storage format is incompatible with the first syntax of the request.

4. The method of claim 1, wherein the access point is a single, centralized access point.

5. The method of claim 1, wherein the access point is created by an access interface.

6. The method of claim 1, wherein the access to the first variable is in a single logical data structure as viewed from an application side.

7. The method of claim 1, wherein the first data storage format maintains the first variable and the variable identifier within the first data storage format.

8. The method of claim 1, further including checking, by the processor, an access permission for the first variable in the catalog.

9. The method of claim 1, further including checking, by the processor, an access permission for the first variable in the catalog, wherein the access permission includes at least one of read access, write access or authorization to view information contained in the first variable.

10. The method of claim 1, wherein the variable identifier includes at least one of a variable name, a preferred data storage format, a time, a requester username, a requester user group, or an application ID.

11. The method of claim 1, further comprising formatting, by the processor, a result of the request into a requested result format.

12. The method of claim 1, further comprising formatting, by the processor, a result of the request into a requested result format, wherein the result comprises data from the first data storage format.

13. The method of claim 1, further comprising generating, by the processor, a log entry corresponding to the request.

14. The method of claim 1, further comprising generating, by the processor, a log entry corresponding to the request, wherein the log entry comprises at least one of a user identifier or an application identifier.

15. The method of claim 1, further comprising:
   receiving, by the processor, the request for access to a second variable stored in a second data storage format, wherein the second data storage format is different from the first data storage format; and returning, by the processor, a result of the request comprising the first variable from the first data storage format and the second variable from the second data storage format.

16. The method of claim 1, further comprising writing, by the processor, data to the first variable in the first data storage format in response to the request.

17. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor, a request having a first syntax at an access point for access to a first variable;
parsing, by the processor, the request to capture a variable identifier for the first variable from the request;
looking up, by the processor, the first variable in a catalog using the variable identifier, wherein the first variable includes a location of the first variable and a first data storage format;
generating, by the processor, a query to access the first variable, wherein the query comprises a second syntax compatible with the first data storage format; and
submitting, by the processor, the query in the first data storage format to complete the request.

18. The system of claim 17, wherein the request comprises a requested action and the variable identifier for the first variable.

19. The system of claim 17, wherein the first data storage format is incompatible with the first syntax of the request.

20. An article of manufacture including a non-transitory, tangible computer readable storage medium having instructions stored thereon that, in response to execution by a processor, cause the processor to perform operations comprising:
receiving, by the processor, a request having a first syntax at an access point for access to a first variable;
parsing, by the processor, the request to capture a variable identifier for the first variable from the request;
looking up, by the processor, the first variable in a catalog using the variable identifier, wherein the first variable includes a location of the first variable and a first data storage format;
generating, by the processor, a query to access the first variable, wherein the query comprises a second syntax compatible with the first data storage format; and
submitting, by the processor, the query in the first data storage format to complete the request.

\* \* \* \* \*